(12) United States Patent
Ndu et al.

(10) Patent No.: US 11,663,017 B2
(45) Date of Patent: *May 30, 2023

(54) KERNEL SPACE MEASUREMENT

(71) Applicant: Hewlett Packard Enterprise Development LP, Houston, TX (US)

(72) Inventors: Geoffrey Ndu, Bristol (GB); Nigel Edwards, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/372,978

(22) Filed: Jul. 12, 2021

(65) Prior Publication Data

US 2021/0342162 A1 Nov. 4, 2021

Related U.S. Application Data

(63) Continuation of application No. 15/962,366, filed on Apr. 25, 2018, now Pat. No. 11,119,789.

(51) Int. Cl.
*G06F 9/4401* (2018.01)
*G06F 9/30* (2018.01)

(52) U.S. Cl.
CPC ........ *G06F 9/4406* (2013.01); *G06F 9/30098* (2013.01)

(58) Field of Classification Search
CPC ... G06F 9/4406; G06F 9/30098; G06F 21/575
See application file for complete search history.

(56) References Cited

U.S. PATENT DOCUMENTS

| | | | |
|---|---|---|---|
| 8,387,046 B1 | 2/2013 | Montague et al. |
| 8,560,845 B2 | 10/2013 | Krstic et al. |
| 8,578,483 B2 | 11/2013 | Seshadri et al. |
| 9,513,975 B2 | 12/2016 | Jones et al. |
| 9,772,953 B2 | 9/2017 | Chen et al. |
| 2003/0115453 A1 | 6/2003 | Grawrock |
| 2005/0138242 A1 | 6/2005 | Pope et al. |
| 2005/0144422 A1 | 6/2005 | McAlpine et al. |

(Continued)

FOREIGN PATENT DOCUMENTS

| | | |
|---|---|---|
| CN | 106127056 A | 11/2016 |
| WO | 2011/042892 A1 | 4/2011 |

OTHER PUBLICATIONS

Dautenhahn et al., "Nested Kernel: An Operating System," in 20th International Conference on Architecture Support for Programming Languages and Operating Systems, 2015, 16 pages.

(Continued)

*Primary Examiner* — Adil Ocak
(74) *Attorney, Agent, or Firm* — Hewlett Packard Enterprise Patent Department

(57) ABSTRACT

A method comprising: generating, with a device, a nonce; writing, with the device, the nonce to a memory location accessible to a kernel; initializing the kernel; in response to an end of initialization, measuring a specified kernel space to produce a first result; writing the first result to a register of a second device; writing a location and size of the specified kernel space to a buffer; measuring the buffer; writing a result of buffer measurement to a second register of the second device; requesting a quote from the second device, the quote to include the nonce, the contents of the register, and the contents of the second register; and passing the quote to the device.

11 Claims, 5 Drawing Sheets

(56) References Cited

U.S. PATENT DOCUMENTS

| | | |
|---|---|---|
| 2006/0137015 A1 | 6/2006 | Fahrny et al. |
| 2013/0024936 A1 | 1/2013 | Jakobsson et al. |
| 2018/0063092 A1 | 3/2018 | Ollikainen et al. |
| 2018/0173551 A1 | 6/2018 | Dunn et al. |
| 2019/0095345 A1 | 3/2019 | Zmudzinski et al. |

OTHER PUBLICATIONS

Dolan-Gavitt et al., "Virtuoso: Narrowing the Semantic Gap in Virtual Machine Introspection", SP '11 Proceedings of the 2011 IEEE Symposium on Security and Privacy, 2011, pp. 297-312.

Intel Corporation, "Intel 64 and IA-32 Architectures Software Developer's Manual 325462-060US", Intel Corp, Sep. 2016.

Jake Edge, "Kernel address space layout randomization", available online at <https://lwn.net/Articles/569635/>, LWN, Oct. 9, 2013, 5 pages.

Jake Edge, "OpenBSD kernel address randomized link", LWN, Jul. 17, 2017, available online at <https://lwn.net/Articles/727697/>, Jul. 12, 2017, 7 pages.

Song, C. et al., "Enforcing Kernel Security Invariants with Data Flow Integrity," (Research Paper), Feb. 21-24, 2016, 15 pages, https://taesoo.gtisc.gatech.edu/pubs/2016/song:kenali.pdf.

Tech Design Forum, "Hardware roots of trust for IoT security", available online at <https://web.archive.org/web/20160902191711/https:/www.techdesignforums.com/practice/technique/hardware-roots-of-trust-for-iot-security/>, Sep. 2, 2016, 5 pages.

KERNEL SPACE MEASUREMENT

CROSS-REFERENCE TO RELATED APPLICATION

This application is a Continuation of U.S. application Ser. No. 15/962,366, filed on Apr. 25, 2018, the content of which are incorporated herein by reference in its entirety. The Applicant hereby rescinds any disclaimer of claim scope in the parent application or the prosecution history thereof and advices the USPTO that the claims in this application may be broader than any claim in the parent application.

BACKGROUND

Computing devices may utilize runtime integrity software to detect malicious programs. The runtime integrity software may execute in the same space as the components that are monitored, thus potentially exposing the runtime integrity software to the same risks posed by the malicious programs.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

Figure 1:
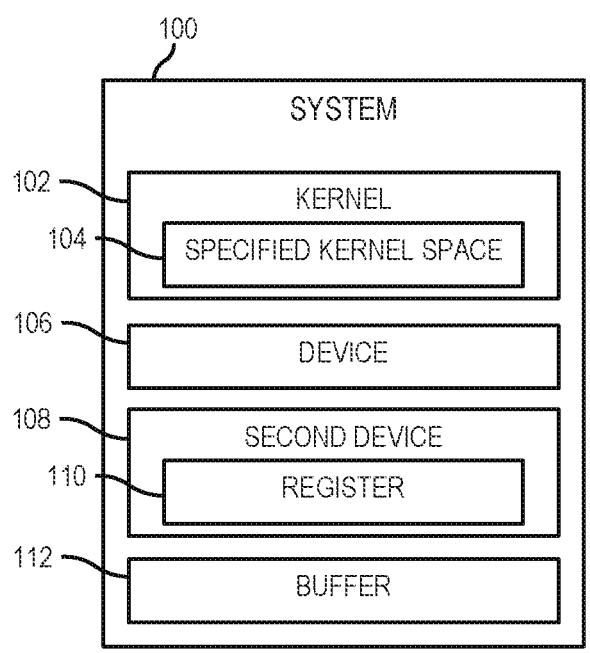
FIG. 1 is a block diagram of a system including a kernel, a device, a second device including a register, and a buffer.

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure.

Computing devices may utilize runtime integrity software to detect malicious programs. The runtime integrity software may execute in the same space as the components that are monitored, thus potentially exposing the runtime integrity software to the same risks posed by the malicious programs.

Examples described herein include a kernel, which upon an end to initialization or boot, may measure a specified kernel space. In other words, the kernel may create a baseline measurement at a point in which the kernel may be deemed to be secure (as in, immediately or soon after initialization or boot). A device, such as a baseboard management controller (BMC), may measure the specified kernel space after the kernel is initialized or after boot and when the kernel indicates to the device that the specified kernel space is ready to be measured. The device may use the initial measurement from the kernel (as in, the baseline measurement) to compare continual or continuous measurements of the kernel from the device. The device may perform other functions, described in detail below, to ensure that the kernel has not been compromised. The kernel, to ensure integrity, may write the initial measurement or baseline measurement to a register of a second device, such as a platform configuration register (PCR) of a trusted platform module (TPM). The device may access the measurement from the PCR or from a quote generated by the second device.

To measure the specified kernel space, the machine-readable instructions to perform such measurements (whether in the kernel or in the device (e.g., BMC)) may use an address in memory identifying a core section of the kernel. In other words, functions of the kernel utilized for core purposes may be measured. The functions may be grouped at a particular section or sections of memory addresses (the section or sections identified by a starting memory address and an offset or a set of addresses). One example described herein includes a split kernel operating system (OS). In a split kernel OS, core machine-readable instructions (as in, code or machine-readable instructions performing core security critical functionality) may be an inner kernel of the OS. In such examples, the inner kernel may be loaded into a known area of memory addresses. Additionally, the inner kernel may be static. A split kernel OS may include an outer kernel. The outer kernel may perform all the other functions of the OS. In such examples, since the addresses of the inner kernel may be known and since the inner kernel may be static (rather than self-modifying, as the outer kernel may be), the specified kernel space may be readily identifiable. Further, the inner kernel may measure itself at the end of initialization or boot. Once ready to be measured, the inner kernel may pass the starting address and an offset or the starting and ending address of itself to a buffer (or some designated memory location) accessible by the device. Thus, the device may obtain the addresses of the specified kernel space to be measured.

Another example includes, rather than a split kernel OS, a driver to identify and measure the specified kernel space. In such an example, the driver may be included in the OS or installed at OS initialization. Further, the driver may be OS specific. The driver may include the addresses (or a starting address and an offset) that identify the specified kernel space. Further, the driver may include a set of addresses and expected measurements (e.g., hash values) corresponding to each address of the set of addresses. In such examples, the driver may, at the end of initialization of the OS, measure the specified kernel space. The driver may also write the measurement to a register of a second device, such as PCR of a TPM. The driver may also write the addresses (or a starting address and an offset) of the specified kernel space to a buffer accessible by the device, such as a BMC. As noted above, once the kernel is ready to be measured (which may occur by some indication from the kernel to the device), the device may utilize the addresses (or starting address and offset) from the buffer to start measuring.

Accordingly various examples, may include a kernel of an OS. The kernel may measure a specified kernel space at an end of the initialization or boot of the OS. The kernel may write or extend the measurement to a register of a second device. The kernel may also pass a plurality of addresses and a size or sizes of the specified kernel space to a buffer. The kernel may request a quote from the second device and may send the quote to a device (such as a BMC). The second device may, in response to the request for the quote, generate the quote. The quote may include a nonce from a register accessible to the second device and/or the kernel, the contents of the register, and a hash of the buffer. The device (e.g., BMC) may generate the nonce and write the nonce to a memory accessible by the kernel 102. The device may include an agent. The agent may, in response to an indication that the kernel is ready, measure the specified kernel space and compare the results to the measurement in the quote.

FIG. 1 is a block diagram of a system 100 including a kernel 102 with a specified kernel space 104, a device 106, a second device 108 including a register 110, and a buffer 112. The system 100 may initialize or boot the kernel 102. The kernel 102 may include a kernel space. The kernel 102 may include a specified kernel space 104. The specified kernel space 104 may include core sections of the kernel 102. In response to an end to initialization or boot of the kernel 102, the kernel 102 may measure the specified kernel space 104. The kernel 102 may extend or write the measurement to the register 110 of the second device 106. The kernel 102 may pass a plurality of addresses and a size or sizes of the specified kernel space 104 to a buffer 112. The buffer 112 may be accessible by the kernel 102 and the device 106. The second device 108 may generate a quote in response to a request for a quote. The quote may include the nonce, the contents of the register, and the hash of the buffer 112. The device 106 may generate and write the nonce to the memory accessible by the kernel 102. The kernel 102 may include the nonce in the request for a quote. The device 106 may include an agent and the agent may gather the plurality of addresses and size of the specified kernel space 104. The agent may utilize the plurality of addresses and size of the specified kernel space 104 to measure the specified kernel space 104. The device 106 may compare the results to the measurement in the quote and take remedial action if the measurements do not match.

As used herein, a "computing device" may be a storage array, storage device, storage enclosure, server, desktop or laptop computer, computer cluster, node, partition, virtual machine, or any other device or equipment including a controller, a processing resource, or the like. In examples described herein, a "processing resource" may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution instructions stored on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Any machine-readable storage medium described herein may be non-transitory.

As used herein, a "device" (as in, the device or the second device) may be any microcontroller, BMC, circuit, CPU, microprocessor, GPU, FPGA, chassis manager, rack level manager, server, TPM, other electronic circuitry suitable to measure data structures in memory and send heartbeat signals and operating independently of an OS, or a combination thereof. For example, the device may be a BMC of a server. In another example, the device may be a top of rack switch or management module. In such examples, the device may operate independently of each system within the racks OS. In such examples, the device may take the measurements of each systems kernel space in each systems memory.

As used herein, an "indicator" may include a signal, a pulse, a message, or the quote noted above. The kernel may send the indicator immediately after initialization, boot, or at some point after initialization or boot. In another example, the indicator may include the time of initialization or boot start and end. In further examples, such as the indicator being the quote noted above, the indicator may include more information.

As used herein, a "Baseboard Management Controller" or "BMC" is a specialized service processor that monitors the physical state of a server or other hardware using sensors and communicates with a management system through an independent "out-of-band" connection. The BMC may also communicate with applications executing at the OS level through an input/output controller (IOCTL) interface driver, a Representational state transfer (REST) application program interface (API), or some other system software proxy that facilitates communication between the BMC and applications. The BMC may have hardware level access to hardware devices located in a server chassis including system memory. The BMC may be able to directly modify the hardware devices. The BMC may operate independently of the OS of the system that the BMC is located in. The BMC may be located on the motherboard or main circuit board of the server or other device to be monitored. The fact that a BMC is mounted on a motherboard of the managed server or otherwise connected or attached to the managed server does not prevent the BMC from being considered "separate". As used herein, a BMC has management capabilities for sub-systems of a computing device, and is separate from a processing resource that executes an OS of a computing device. The BMC is separate from a processor, such as a central processing unit, executing a high level OS or hypervisor on a system.

As used herein, an "operating system" or "OS" is machine-readable instructions that may be stored in a machine-readable storage medium and executed by a processing resource. An OS may include system software that manages computer hardware and software resources, as well as providing common services for computer programs. The OS may facilitate communications between a computing devices hardware and applications. The OS may include a user interface that allows a user to interact with the computing device. The OS may include layers, such as an application layer and a kernel layer. High level applications (as in, applications that a user may interact with) may execute at the application layer of an OS, while the kernel layer may include machine-readable instructions that control the computing devices hardware. During the setup or initialization of a computing device, an OS may be installed. During a computing devices boot or start-up process, the OS may load into a machine-readable storage medium. As noted above, a processor or processing resource of the computing device may execute the OS from the machine-readable storage medium.

As used herein, a "kernel" may be a part of the OS. The kernel may be the part of the OS that provides the most basic level of control over all of the computer's hardware devices. The kernel may manage memory accesses, allot hardware resources, manage the processing resources operating states, and manage data. An OS may include a single, self-modifying kernel. In other words, the kernel may be dynamically modified while operating. In such examples, sections of the machine-readable instructions of the kernel may be included or excluded. In another example, the OS may include two kernels. In other words, the OS may be a split kernel OS. One kernel may be static, while the other may be self-modifying.

A kernel space may be a part of a virtual memory of a computing device. The virtual memory may map virtual addresses of a program into physical addresses in computer memory of computing device, such as a machine-readable storage medium or other memory device. A processor of the computing device may segregate the virtual memory of the computing device into the kernel space and a user space. For example, the kernel space may be reserved for running the kernel, kernel extensions, and device drivers. The user space, in contrast, may be the memory area where applications and services are executed.

Furthermore, the kernel space may be divided into an inner region (as in, inner kernel) and an outer region (as in, outer kernel). The inner portion of the kernel may be loaded in the inner region, and the outer portion of the kernel may be loaded in the outer region. The inner portion may, in some examples, have direct access to the hardware of computing device. In contrast, a virtual memory interface may be presented to the outer portion, which may not have direct access to privileged portions of the hardware, such as a memory management unit. The security goals of the kernel division are integrity guarantees for kernel code and critical data along with kernel control flow integrity, and information flow control enforcement across processes within the kernel.

For example, the inner portion of the kernel (e.g., inner kernel) may include a memory management unit, a process management unit, and architecture specific code. The memory management unit may be a hardware unit that manages virtual memory and performs translation of virtual memory addresses to physical memory addresses. The process management unit may manage the data structures for processes running on the operating system. The architecture specific code may be custom instructions that modify an existing kernel to implement an example kernel architecture described herein. The inner kernel may manage communication with the outer portion of the kernel by providing a restricted API which may be accessible to any outer kernel component. The inner kernel may be static (as in, not self-modifying).

In some examples, the outer portion of the kernel (e.g., outer kernel) may include all other components of the kernel not included in the inner portion. For example, the outer portion may include a file systems unit and a device driver unit. The file systems unit may provide an abstraction of files to user space programs. For example, the file systems unit may communicate with other outer kernel components including the device driver unit. The device driver unit may provide interfaces for hardware devices, which may enable the operating system to access hardware functions. The outer kernel may be self-modifying (as in, to improve efficiency of the outer kernel, the outer kernel itself may load modules or patch read-only code (to include/exclude code) all while continuing to execute).

In some examples, the kernel space may be divided into the inner region, which loads the inner portion of the kernel, and the outer region, which loads the outer portion of the kernel, by nested page tables. The inner portion of the kernel may be mapped in an inner page table, which may have controlled access from the outer portion of the kernel and any processes running on the outer portion of the kernel. For example, the inner portion may be inaccessible, read-only, or a combination of both. The outer portion, on the other hand, may be mapped in an outer page table, which may map directly to physical memory, but the nested structure of the inner page table and the outer page table controls the access to the inner portion of the kernel. As a result, in some examples, an attempt to write the inner portion of the kernel by the outer portion of the kernel may cause a violation if the access is read-only or inaccessible. Furthermore, the mapping from the outer page table to physical memory may be controlled by the inner portion of the kernel through the inner page table. The mapping of the outer portion of the kernel and its processes' virtual memory to physical memory may thus be under the complete control of the inner portion of the kernel.

It should be noted that the inner portion of the kernel and the outer portion of the kernel may, in some examples, be loaded initially as a single kernel image. The processes of the kernel may then be dynamically transitioned into their respective portions. The entire kernel may share the same code base but attempts to access privileged functionality, such as those restricted to the inner portion of the kernel, from the outer portion of the kernel may cause a violation.

As used herein, a "cryptographic hash function" may be a function comprising machine-readable instructions. The cryptographic hash function may include machine-readable instructions that, when executed by a processor, may receive an input. The cryptographic hash function may then generate a hexadecimal string to match the input. For example, the input may include a string of data (for example, the data structure in memory denoted by a starting memory address and an ending memory address). In such an example, based on the string of data the cryptographic hash function outputs a hexadecimal string. Further, any minute change to the input may alter the output hexadecimal string. In another example, the cryptographic hash function may be a secure hash function (SHA), any federal information processing standards (FIPS) approved hash function, any national institute of standards and technology (NIST) approved hash function, or any other cryptographic hash function.

As used herein, a "Root of Trust device" or RoT device may be a device that behaves in an expected manner, as the RoT devices misbehavior may not be detectable. In other words, the RoT device may be inherently trusted software, hardware, or some combination thereof. A RoT device may include compute engines. The compute engine may be software operating in the RoT device, hardware of the RoT device, or some combination thereof. For example, a RoT device may include a Root of Trust for Storage (RTS). The RTS may be a compute engine capable of maintain an accurate summary of values. For example, the RoT may be a TPM. In such examples, the TPM may include a PCR (or a plurality of PCRs). Further, the RTS may be a PCR (or a plurality of PCRs). In another example, the RoT may include a Root of Trust for Reporting (RTR). The RTR may be a compute engine capable of sending requested information to a requesting device. The information may include the contents in a register of the RoT (or the contents of the RTS) and information specified by the requester. In an example, the RTR may send a quote including the information described above. The RoT may include other compute engines not described here, such as a compute engine to measure specified values or a compute engine to authenticate.

As used herein, a "trusted platform module" or "TPM" may be an integrated circuit built into a motherboard of a computing device. The TPM may be tamper resistant or tamper proof. The TPM may be utilized for services on the computing device. The services may include device identification, authentication, encryption, measurement, determine device integrity, secure generation of cryptographic keys, remote attestation, and sealed storage. The TPM may include platform configuration registers (PCRs). The PCRs may store security relevant metrics. Machine-readable instructions (such as a kernel) or devices may extend the PCR with data. To extend a PCR with a measurement, the machine readable instructions or device extending the PCR may send a new value to the TPM. The TPM may take a hash of the new value and the current value in the PCR. The TPM may store the result in the PCR.

As used herein, a "buffer" may be a region of memory to be utilized for storing data temporarily, while the data is moved from one location to another. The buffer may be a fixed size or a variable size. The buffer may be located in the machine-readable storage medium of the system. Further, the buffer may be located in the memory of the system.

As used herein, "SMM" (or system management mode) may be an operating mode of the processor of a system or computing device. During SMM, the processor may suspend normal executions. For example, the processor may suspend OS executions. While the executions are suspended, machine-readable instructions in the systems firmware may execute, for example, to gather the processor state, handle an event, or for some other purpose. System hardware or software may send a signal or write, called a system management interrupt (SMI) to indicate to the processor to enter SMM.

As used herein, an "agent" may be an application program, in other words, machine-readable instructions. The agent may be installed on the system or a device of the system. The agent may operate in a machine-readable storage medium. For example, an agent may reside in the machine-readable storage medium of a BMC or of a system. The agent may communicate through a representational state transfer (REST) application program interface (API), IOCTL interfaces, or some other communication method with other devices or software. For example, an agent may reside in the machine-readable storage medium of a BMC and communicate with an OS through an IOCTL interface.

As used herein, a "nonce" may be an arbitrary random number. A random number generator (RNG) may generate the nonce. In another example, the nonce may be pseudo-random. In an example, the nonce may be used once. In such examples, a device may request a nonce from another device. The other device may include an RNG. The RNG may generate the nonce and the other device may send the nonce to the requesting device.

Figure 3:
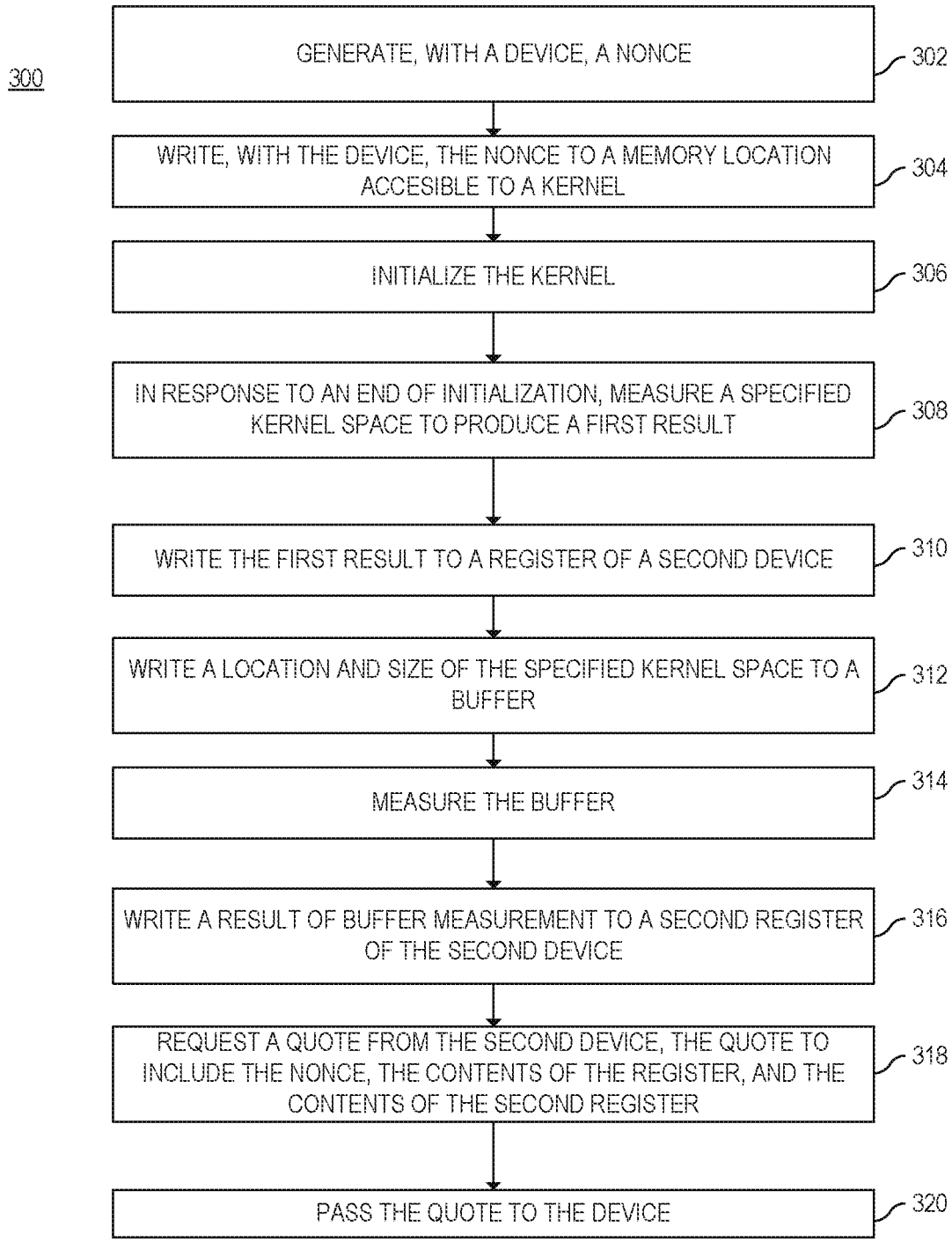
FIG. 3 is a flow chart of a method to obtain addresses and measurements of a specified kernel space, according to one example.

FIG. 3 is a flow chart of a method to obtain addresses and measurements of a specified kernel space, according to one example. Although execution of method 300 is described below with reference to the system 100 of FIG. 1, other suitable systems or modules may be utilized, including, but not limited to, system 200 or computing device 400. Additionally, implementation of method 300 is not limited to such examples.

At block 302, the device 106 may generate a nonce. The device 106 may include an RNG. In an example, the device 106 may be a BMC. In another example, the device 106 may be some other device or component, including, but not limited to, a microcontroller, FPGA, integrated circuit, processor, or GPU. The quote, generated by a second device 108, may include the nonce. In response to the reception of the quote by the device 106 from the kernel 102, the device 106 may use the nonce to verify that the kernel 102 is authentic. In other words, the device 106 may expect to receive the nonce originally generated and receiving a no-matching nonce may indicate a compromise.

At block 304, the device 106 may write the nonce to a memory location accessible to a kernel 102. In an example, in response to the nonce being written to the memory location, the kernel 102 may obtain the nonce. The kernel 102 may request a quote from the second device 108. In the request to the second device 108, the kernel 102 may include the nonce obtained from the memory location. The second device 108 may include the nonce in the quote. In another example, the device 106 may write the nonce to a designated or pre-designated memory location accessible by the kernel 102. In other words, the device 106 may designate an area in memory to write the nonce to. The device 106 may notify the kernel 102 of the designated memory area. In another example, the device 106 may write the nonce to a memory location accessible by the second device 108.

At block 306, the system 100 may initialize the kernel 102. In other words, the system 100 may boot or start a boot process. Initialization or boot may include a new OS installation, a reboot (system restart), a cold boot, or some other scenario that involves loading an OS into memory and executing the OS loaded into memory.

At block 308, in response to the end of initialization or boot, the kernel 102 may measure a specified kernel space 104 to produce a first result. In one example, an inner kernel of the kernel 102 may measure the specified kernel space 104. In another example, a driver included or packaged with the OS and installed during the initialization or boot process may measure the specified kernel space 104. In other words, the driver may be included in the machine-readable instructions utilized to initiate the OS. In another example, the driver may be included in a non-volatile memory of the system 100 and, during the installation of the OS, machine-readable instructions may install the driver from the non-volatile memory at some point during the OS installation or boot. In another example, the measurement may include, taking the data stored in a starting address of the specified kernel space 104 to an end address of the specified kernel space 104 and using a cryptographic hash function to produce a result. In another example, the measurement may include using, as an input to the cryptographic hash function, data stored in the specified kernel space 104, the data indicated by a starting memory address of the specified kernel space 104 and the size of the specified kernel space 104 (in other words, an offset of the specified kernel space 104). In such examples, the output of the cryptographic hash function may be the first result. In another example, a different function may measure the memory. In another example, the first result produced by the kernel 102 measuring the specified kernel space 104 may be considered a baseline or initial measurement.

In another example, the kernel 102 (as in, the driver or inner kernel) may measure the specified kernel space 104 by scanning the specified kernel space 104. In other words, the kernel 102 (e.g., the inner kernel or driver) may include machine-readable instructions, that when executed (in response to an end to initialization or boot), measure the specified kernel space 104. In such examples, the specified kernel space 104 may include code or machine-readable instructions that perform core functions of the system 100. In the example of a split kernel OS, the inner kernel may perform core functions and as such, the inner kernels kernel space may be the specified kernel space 104. In the example of a driver, the driver may contain a pre-defined set of addresses or a pre-defined address and an offset or offsets corresponding to an address of the specified kernel space 104. In other words, the specified kernel space 104 to be measured may include a plurality of regions of memory. In such examples, the regions of memory may not be contiguous. Further, the driver may include either, the starting address and ending address for each region or the starting address and size or offset for each region. In addition, the driver may include corresponding measurements (e.g., hash values) for each region (the corresponding measurements taken at an end of initialization or boot). In another example, the driver may write the addresses and the corresponding measurements of each set of addresses to a file or pre-designated memory location. The driver may then take a hash of the file and write the hash to the register 110 or extend the register 110 with the hash.

As the size and contents of the specified kernel space 104 may be static, the measurement may be a known value. In other words, the measurements of the specified kernel space 104 may remain the same. Further, if the results of the measurements are to change, then a compromise may be present in the system 100. In another example, the cryptographic hash function used to measure the specified kernel space 104 may output a hexadecimal string based on the data in the specified kernel space 104. In such examples, the kernel 102 (e.g., the inner kernel or the driver) may include the cryptographic hash function. Further, small variations to the input of the cryptographic hash function may result in a drastically different output, thus even minor changes to the specified kernel space 104 may result in a different output (indicating a compromise).

In another example, the kernel 102 may be self-modifying. In such examples, the specified kernel space 104 may change over time. In such examples, the driver may determine the modifications to be applied to the kernel 102 and if the modifications to the kernel 102 may affect the specified kernel space 104. Further, the driver may determine, in response to the modifications affecting the specified kernel space 104, a new set of addresses, a new set of offsets corresponding to each address of the set of addresses, a new baseline or initial measurement, and/or a new set of expected measurements corresponding to each address of the set of addresses.

In another example, the kernel 102 may include instructions that when reached during initialization or boot indicate an end to initialization. In other words, the kernel 102 may indicate that the specified kernel space 104 may be measured (for example, measured by the inner kernel or driver). In another example, the driver (described above) may monitor the initialization or boot process and may determine when an end to initialization or boot is reached. In another example, the kernel 102, the inner kernel, or the driver may write the length of the initialization or boot time to a memory location. In another example, the kernel 102, the inner kernel, or the driver may send the length of initialization or boot time to device 106 (e.g., a BMC). In an example, rather than sending the length of time, the kernel 102, inner kernel, or the driver may send a start time of initialization or boot and an end time of initialization or boot. In another example, the device 106 may monitor the initialization or boot time, rather than receiving data on the initialization or boot time from the kernel 102, inner kernel, or the driver.

At block 310, the kernel 102 may write the first result to a register 110 of a second device 108 or extend the register 110 of a second device 108 with the first result. In another example, the inner kernel or driver may write the first result to the register 110 or extend the register 110 with the first result. In another example, the second device 108 may be a TPM. In a further example, the register 110 may be a PCR of the TPM. In such examples, the kernel 102, inner kernel, or driver may extend the PCR of the TPM with the first result. In another example, the measurements may include measurements of a set of addresses. In other words, the first result may comprise a set of measurements. In such examples, the inner kernel or driver may write the first result (e.g., set of measurements) to buffer 112, another buffer, or some designated region in memory. The inner kernel or driver may then measure the buffer 112, other buffer, or some designated region in memory and write the result to the register 110 or extend the register 110 with the result.

At block 312, the location and size of the specified kernel space 104 may be written to a buffer 112. In an example, the kernel 102 may write the location and size of the specified kernel space 104 to the buffer 112. In another example, the inner kernel or the driver may write the location of the specified kernel space 104 to the buffer 112. In another example, the location of the specified kernel space 104 may include the starting memory address of the core functionality code or machine-readable instructions in the kernel 102. In a further example, the location of the specified kernel space 104 may include the ending memory address (as well as the starting memory address) of the core functionality code or machine-readable instructions of the kernel 102. In another example, the kernel 102, inner kernel, or driver may write the size of the specified kernel space 104 to the buffer 112. The size may be referred to as an offset or memory offset. In such examples, a device 106 could determine the specified kernel space 104 based on a starting memory address and the offset (or addresses and corresponding offsets). In another example, the buffer 112 may comprise a pre-defined or designated section of memory.

At block 314, the kernel 102 may measure the buffer 112. In another example, the inner kernel or driver may measure the buffer 112. In another example, the kernel 102, inner kernel, or driver may utilize the cryptographic hash function described above to measure the buffer 112. In other words, the result of the buffer 112 measurement may be the output of the cryptographic hash function.

At block 316, the kernel 102 may write the result of buffer 112 measurement to a second register (not shown in FIG. 1) of the second device 108. In an example, the second device 108, as noted above, may be a TPM. In a further example, the second register may be a second PCR of the TPM. In an even further example, the TPM may include a plurality of PCRs. In another example, the kernel 102, inner kernel, or driver may write the result of buffer 112 measurement to the second register.

At block 318, the kernel 102 may request a quote from the second device 108. In an example, the request for a quote may include the nonce generated by the device 106 for the second device 108 to include in the quote. In an example, the quote may include the information stored in (in other words the contents of) the register 110 and second register. In another example, the quote may also include the nonce (either received from whichever device is requesting the quote or, if the nonce is written to another register or the second device extends the other register with the nonce, from the other register of the second device 108). In another example, the quote may include other information stored in other registers of the second device 108 (e.g., other PCRs of the TPM). The other information may include measurements of the location and/or size of the specified kernel space 104, the memory address of the buffer 112, a signature form the second device 108, and/or a signature from the kernel 102. In an example, the quote may be in a JSON, XML, or some other suitable format. In another example, in response to the generation of the quote, the second device 108 may send the quote to the kernel 102.

At block 320, the kernel 102 may pass, send, or transmit the quote to the device 106 (e.g., a BMC). In an example, the kernel 102 may connect to the device 106 through a REST API, an IOCTL interface, or through some other suitable interface for transferring data. In another example, the device 106 may request the quote. In such examples, the second device 108 (e.g., a TPM) may pass, send, or transmit the quote to the device 106 (e.g., BMC).

In another example, the kernel 102 may send an indicator to an agent. The agent may be machine-readable instructions executable by a processing resource. The device 106 may include a processing resource and a machine-readable storage medium. In such examples, the machine-readable storage medium may include the machine-readable instructions of the agent (in other words, the agent may be installed on the device 106). The processing resource of the device 106 may execute the machine-readable instructions of the agent (in other words, the agent may operate or execute on the device 106). In an example, the indicator may signal or indicate to the agent on the device 106 that the kernel 102 is ready to be measured. In other words, the indicator may indicate that the agent may start to measure the specified kernel space 104. In one example, the indicator may be a signal from the kernel 102 to the agent. In a further example, the signal may be a bit sent over a connection or communication channel (as in, REST API, IOCTL, etc.). In another example, the indicator may be the quote itself. In other words, in response to the reception of the quote by the device 106, the device 106 may begin (or begin after verification of the quote) measuring the specified kernel space 104. In another example, the indicator may include the total time for initialization or boot. In another example, the indicator may include the start time for initialization or boot and the end time for initialization or boot.

In another example, the agent may verify the quote from the kernel 102. In an example, the agent may verify a signature included in the quote. In another example, the agent may verify that the nonce included in the quote is the same as the nonce generated by the device 106 itself. For example, the agent may access the nonce generated by the device 106 from the device 106 since the agent may operate in the device 106 (In other words, the agent may have access to data stored in or generated by the device 106). In another example, the agent may verify the result of buffer 112 measurement. In other words, the agent may measure the buffer 112 (for example, by utilizing the same cryptographic hash function described above) and verify that the results of the buffer 112 measurement included in the quote matches. Such examples may ensure that the device 106 may obtain the correct location and size of the specified kernel space 104, as well as ensuring that the data stored in the buffer 112 is not compromised. In the case that the quote is determined to contain invalid information, the agent may take remedial action. Invalid information may include, but not be limited to, a signature that is not valid, a nonce of an unexpected value, or a result of buffer measurement being different. Remedial action may include a system restart/reboot, a system re-image, or the like.

In another example, the agent may measure the specified kernel space 104 to produce a second result. The agent may start measuring the specified kernel space 104 in response to the indication to start measurements from the kernel 102. In another example, the agent may start measuring the specified kernel space 104 in response to the verification of the quote. In other words, after the agent verifies the signature, the nonce, and/or the results of the buffer measurement, the agent may begin measuring the specified kernel space 104.

In another example, the agent may verify that the second result matches the first result. In other words, the agent may verify that the baseline or initial measurement of the specified kernel space 104 from the quote matches the agent's measurement. Since the specified kernel space 104 may be static, the measurement may remain the same over time. As noted, the agent and the kernel 102, inner kernel, or driver may use a cryptographic hash function to measure the specified kernel space 104. In such examples, even a minute change in the specified kernel space 104 may result in a drastically different hash, result, or output. Differing results may indicate a potential breach or compromise. In the case that the results from the agent do not match the results in the quote, the agent may initiate remedial action. Remedial action may include a system restart or reboot, a system re-image, firmware re-installation, or the like.

In another example, the agent may continually or continuously measure the specified kernel space 104. In other words, the agent may measure the specified kernel space 104 and verify those results against the results (in other words, baseline measurement) in the quote. The agent may then perform the two steps continually (as in, repeatedly at a regular interval) or continuously (as in, repeatedly without interruption or intervals in between measurements). In another example, the agent may continue to measure the specified kernel space 104 immediately after verification of the results. In another example, the agent may measure the specified kernel space 104 and verify the results at a pre-defined set of time periods or intervals. In such examples, a user may set or define the set of time periods. In another example, the device 106 may set, define, or alter the set of time periods or intervals.

In another example and as noted above, the kernel 102 may be a split kernel with an inner kernel and an outer kernel. In such examples, the agent may confirm that the processor of the system 100 is operating in a non-root mode with an exit to root mode landing in a valid address in the inner kernel. To check the state of the processor, the agent may first trigger an SMI. In another example, the agent may check for other devices in the system triggering an SMI and in the event that an SMI is triggered, check the processor state and non-root mode exit, thus reducing the frequency of SMIs. After an SMI is triggered, the system 100 may enter SMM. The system 100 may contain specific code that reads the processors hardware register state on behalf of the agent. When the system 100 enters SMM, the specific code may read the processors hardware register state and send the readout to the agent. In the case that the processor of the system 100 is not operating in a non-root mode with an exit to root mode landing at a valid address in the inner kernel, the agent may take remedial action. In such examples, the valid address in the inner kernel may be any address within the inner kernel. As described above, the agent may determine the range of addresses of the inner kernel by using the location and size of the inner kernel stored in the buffer 112. Remedial action may include a system restart or reboot, a system re-image, or the like.

In another example, the agent may check for a longer than normal initialization or boot time. A longer than normal initialization or boot time may indicate that the system 100 may have been tampered with or experienced some breach or compromise. In such examples, the agent may monitor the initialization or boot time of the system and may determine whether the initialization or boot time has taken longer than normal. In another example, the kernel 102 may provide the initialization or boot time to the agent. In a further example, the kernel 102 may provide the initialization or boot start time and end time. In a further example, the second device 108 may include, from the kernel 102, the initialization or boot time in the quote. In an example, the device 106 may determine what a longer than normal initialization or boot time is. For example, the device 106 may contain information on an average initialization or boot time frame and the device 106 may determine how long past that average time is acceptable. In another example, a user may set, for the agent to follow, the time frame for a longer than normal initialization or boot time. In the case that the system 100 takes longer than normal to initialize or boot, the agent may take remedial action. Remedial action may include a system restart or reboot, a system re-image, or the like.

Figure 2:
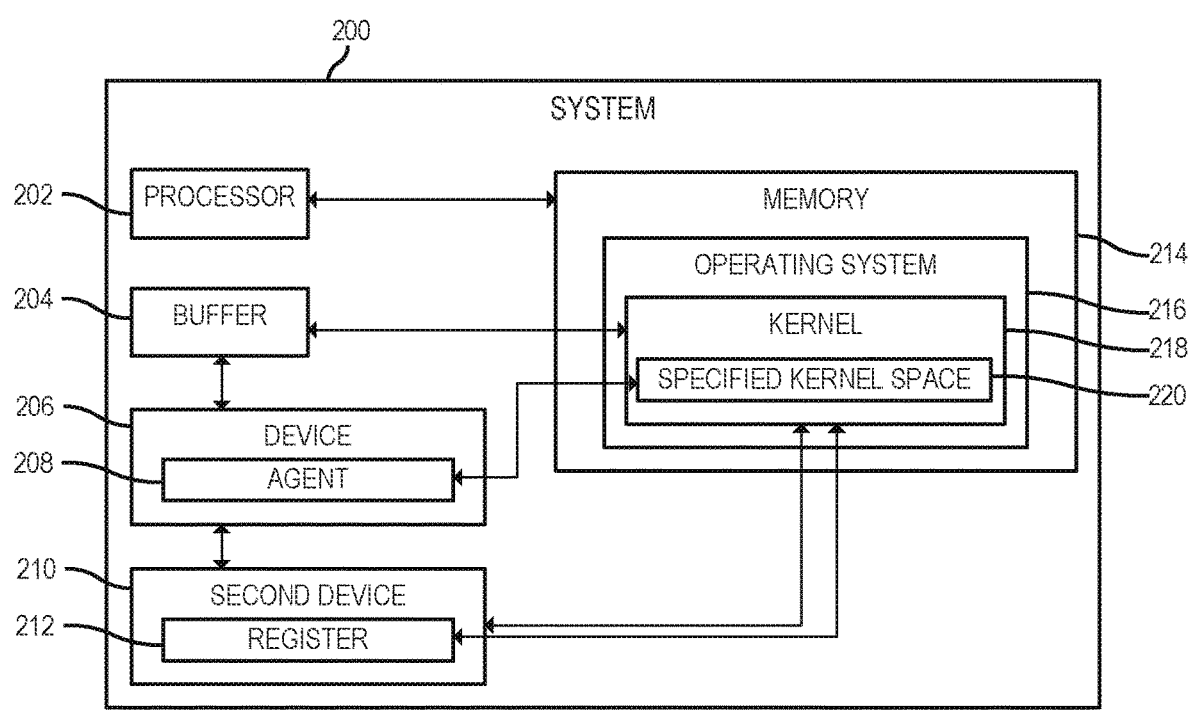
FIG. 2 is a block diagram of a system including a processor, buffer, device with an agent, a second device with a register, and a memory with an OS, the OS including a kernel and specified kernel space.

FIG. 2 is a block diagram of a system 200 including a processor 202, a buffer 204, a device 206 with an agent 208, a second device 210 with a register 212, and a memory 214 with an OS 216, the OS 216 including a kernel 218 and specified kernel space 220. In such examples, the memory 214 may be loaded with an OS 216 during boot or initialization. The processor 202 may execute machine-readable instructions stored in the memory, in other words, the processor 202 may execute the OS 216. The OS 216 may include a kernel 218, as described above. The kernel 218 may include machine-readable instructions to measure a specified kernel space 220 in response to an end to initialization or boot of the OS 216. The result of the measurement may be considered a baseline measurement or, in other words, an initial measurement taken at a time when it is most likely that the OS has not been compromised. The machine-readable instructions may store the measurement or result in a register 212 of a second device 210. The machine-readable instructions may also pass the address (either the beginning address or the beginning address and end address) and size or offset of the specified kernel space 220 to a buffer 204. In another example, the machine-readable instructions may pass a plurality of addresses and a plurality of sizes or offsets, each size or offset corresponding to an address of the plurality of addresses. The machine-readable instructions may also measure the buffer 204 and store the measurement taken at the end of initialization or boot in another register (not illustrated) of the second device 210. The machine-readable instructions may also request that the second device 210 generate a quote. The machine-readable instructions may also include instructions to send an indicator to the device 206, the indicator notifying the device 206 that the kernel is ready to be measured. The machine-readable instructions may send the quote along with the indicator. In another example, the quote may be the indicator. In another example, the kernel 218 may be a split kernel, as in an inner kernel and an outer kernel. In such examples, the inner kernels kernel space may be the specified kernel space 220.

As noted above, the system 200 may include a device 206. The device 206 may generate a nonce. The device 206 may write the nonce to a register or some designated memory location accessible by the second device 210 and/or the kernel 218. The device 206 may include an agent 208. The agent 208 may verify the quote (generated by the second device 210 and sent to the kernel 218) from the kernel 218. In other words, the agent 208 may ensure that the signature is valid, the measurement of the buffer matches the agents 208 measurement of the buffer, and that the nonce is the expected value. The agent 208 may, in response to the reception of the indicator and verification of the quote from the kernel 218, start measuring the specified kernel space 220. The agent 208, after measuring the specified kernel space 220, may verify the results against the results in the quote. If the results do not match, the device 206 may take remedial action. As noted, the agent 208 may continually or continuously measure and verify the specified kernel space 220. In another example, the device 206 may be a BMC.

As noted above, the system 200 may include a second device 210. The second device 210 may be a cryptographic device, such as, a RoT device. In a further example, the RoT device may be a TPM. As noted above, the second device 210 may include a register 212. In another example, the second device 210 may include multiple registers. In a further example, the registers may be PCRs of a TPM. In an example, the second device 210 (e.g., the RoT device) may, in response to a request for a quote, generate a quote. The quote may include the nonce from the kernel 218 (which may be included in another register of the second device 210), the contents of the register 212, and the hash of the buffer 204 (which may be included in another register of the second device 210). Once the quote is generated, the second device 210 may send the quote to the kernel 218 (the kernel 218 to send the quote to the device 206) or whichever device or machine readable instructions requested the quote (if different than the kernel 218).

Figure 4:
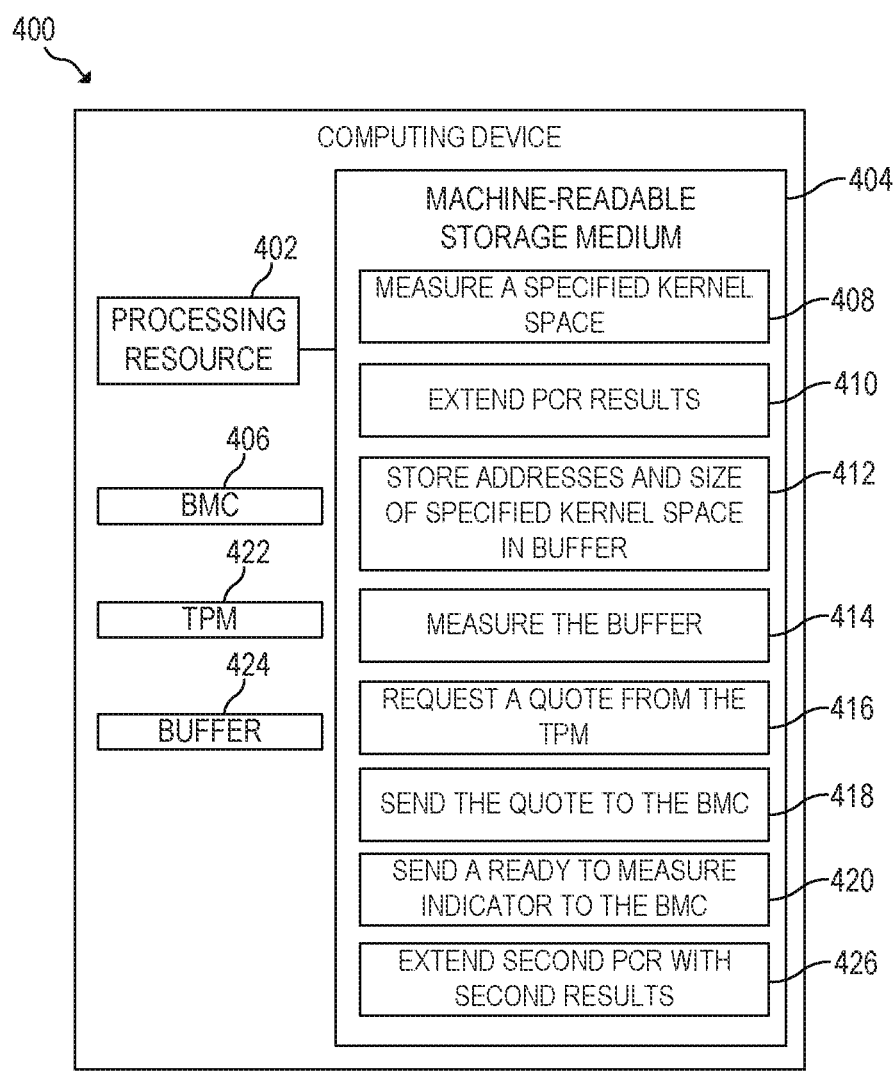
FIG. 4 is a block diagram of a computing device capable of measuring a specified kernel space, extending a platform configuration register of a Trusted Platform Module with the specified kernel space measurement, and sending a quote from the Trusted Platform Module to a Baseboard Management Controller.
Figure 5:
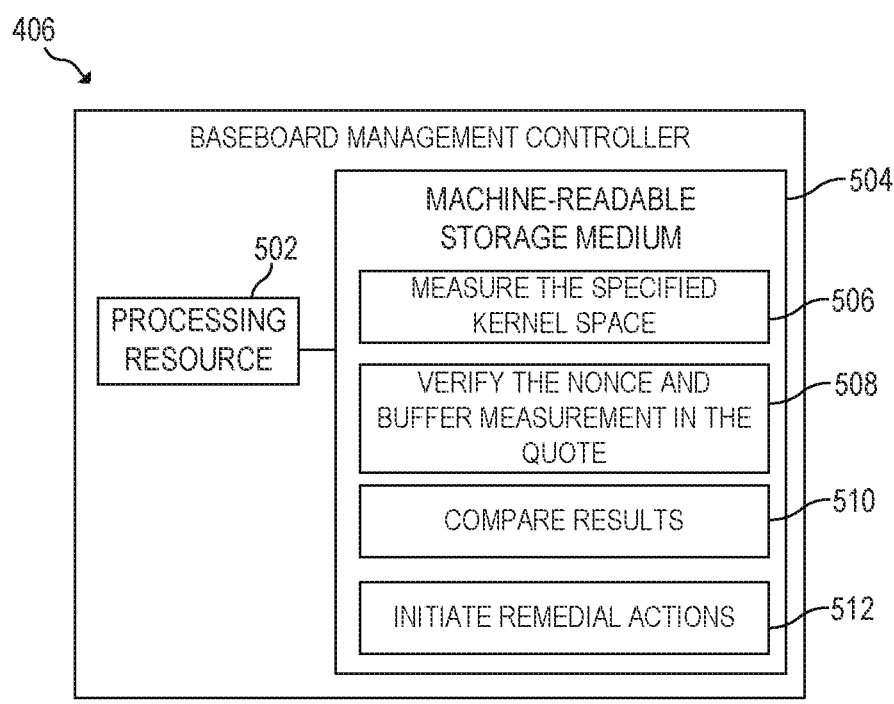
FIG. 5 is a block diagram of a Baseboard Management Controller measuring a specified kernel space and comparing the result to the value in a quote.

FIG. 4 is a block diagram of a computing device 400 capable of measuring a specified kernel space, extending a PCR of a TPM 422 with the specified kernel space measurement, and sending a quote from the TPM 422 to a BMC 406, according to one example. The computing device 400 may include a processing resource 402, a machine-readable storage medium 404, a BMC 406, a TPM 422, and a buffer 424. The processing resource 402 may execute instructions included in the machine-readable storage medium 404. The BMC 406 may execute instructions included in the BMC's 406 own machine-readable storage medium (as shown in FIG. 5). The machine-readable storage medium 404 of the computing device 400 may include instructions 408 to measure a specified kernel space. The instructions 408 may, when executed by the processing resource 402, may, in response to an end to an initialization or boot process, measure a specified kernel space of a kernel of the computing device 400. In an example, instructions 408 may be included in the kernel of the computing device 400. In a further example, the instructions may be included in an inner kernel of a split kernel OS. In such examples, the specified kernel space may be the kernel space of the inner kernel. In another example, the instructions 408 may be included in a driver included with the OS of the computing device 400. In such examples, the driver may indicate the memory addresses for the specified kernel space.

The machine-readable storage medium 404 may include instructions 410 to extend a PCR of the TPM 422 with the results of the measurement of the specified kernel space. As noted above, the instructions 408, when executed, may measure the specified kernel space at the end of the initialization or boot process. After the measurement, the processing resource 402 may execute instructions 410 to extend (or in another example, write) a PCR of the TPM 422 with the measurement.

The machine-readable storage medium 404 may include instructions 412 to store the addresses (in other words, a plurality of addresses) and a size (or a plurality of sizes, each size corresponding to an address of the plurality of addresses) of the specified kernel space in a buffer 424. In an example, the buffer 424 may be located in a designated area of the machine-readable storage medium 404. In an example, the buffer 424 may be accessible to the BMC 406 and the kernel.

The machine-readable storage medium 404 may include instructions 414 to measure the buffer 424. In an example, after the addresses and the size (or sizes) of the specified kernel space are written to the buffer 424, the processing resource 402 may execute instructions 414 to measure the buffer 424. In another example, in response to the measurement of the buffer 424, the processing resource may execute instructions 426 to extend another PCR or second PCR of the TPM 422 with the buffer 424 measurement (e.g., with a hash of the buffer 424).

The machine-readable storage medium 404 may include instructions 416 to request a quote from the TPM 422. In an example, after initialization or boot, measurement of the specified kernel space, storing the addresses and size (or sizes) of the specified kernel space in the buffer 424, and measuring the buffer 424 the processing resource 402 may execute the instructions 416 to request a quote from the TPM 422. The TPM 422 may generate the quote, in response to the request. The request for the quote may include the nonce from the kernel (the nonce generated by the BMC 406). The quote may include the measurement of the specified kernel space, the measurement of the buffer, and a nonce generated by the BMC 406. The quote may indirectly include the measurement of the specified kernel space, the measurement of the buffer, and a nonce generated by the BMC 406. In other words, the quote may include a hash of the measurement of the specified kernel space and some previous value in the register or PCR, a hash of the measurement of the buffer and some previous value in a second register or second PCR, and a hash of the nonce and some previous value stored in a third register or third PCR. In another example, all measurements may be included in one hash. For example, the kernel may extend the PCR with the measurement of the specified kernel (as in, a hash of the measurement and current PCR value). Then, the kernel may extend the PCR with the measurement of the buffer (as in, a hash of the measurement of the buffer and the hash of the measurement of the specified kernel and previous PCR value), and so on. Such extensions may create a chain of hashes containing all measurements and any other relevant data. In response to the reception of the quote by the kernel, the processing resource 402 may execute instructions 418 to send the quote to the BMC 406. In response to the sending of the quote, the processing resource 402 may execute instructions 420 to send a ready to measure indicator to the BMC 406.

FIG. 5 is a block diagram of a BMC 406 capable of measuring a specified kernel space and comparing the result to the value in a quote. The BMC 406 may include a processing resource 502 and a machine-readable storage medium 504. The processing resource 502 may execute instructions included in the machine-readable storage medium 504. The machine-readable storage medium 504 may include instructions 506 to measure the specified kernel space. In response to the reception of a ready to measure indicator, the BMC 406 may start measuring the specified kernel space.

The machine-readable storage medium 504 may include instructions 508 to verify the nonce and the buffer measurement in the quote. In one example, before the BMC 406 measures the specified kernel space (in other words, before instructions 506 are executed), the processing resource 502 may execute instructions 508 to verify that the nonce is the value originally generated by the BMC 406 and that the measurement of the buffer by the BMC 406 matches the buffer measurement in the quote. In such examples, if the nonce and/or buffer measurement does not match, the BMC 406 may initiate remedial actions through the processing resource 502 executing instructions 512.

The machine-readable storage medium 404 may include instructions 510 to compare the results of the BMCs 406 measurement of the specified kernel space with the measurement of the specified kernel space by the kernel. In an example, in response to the measurements matching, the processing resource 502 may execute, continually or continuously, instructions 506 followed by instructions 510. In response to the measurements not matching, the processing resource 502 may execute instructions 512 to initiate remedial actions.

Although the flow diagram of FIG. 4 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present disclosure.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be examples. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A method comprising:
   generating, with a first device, a nonce;
   writing, with the first device, the nonce to a memory location accessible to a kernel;
   initializing the kernel;
   in response to an end of the initialization of the kernel, measuring a specified kernel space to produce a first result;
   writing the first result to a first memory of a second device;

writing a location and a size of the specified kernel space to a buffer;

measuring the buffer including the location and the size of the specified kernel space to produce a buffer measurement result comprising a hash value;

writing the buffer measurement result to a second memory of the second device;

requesting a quote from the second device;

passing, to the first device, the quote including the nonce, the first result from the first memory, and the buffer measurement result from the second memory; and verifying, by the first device, the buffer measurement result including the hash value.

2. The method of claim 1, further comprising:

in response to the verifying, measuring, by the first device, the specified kernel space to produce a second result; and determining, by the first device, that a potential compromise of the kernel has occurred in response to the second result not matching the first result.

3. The method of claim 2, further comprising:

sending, with the kernel to an agent operating in the first device, an indicator to indicate that the kernel is ready to be measured;

verifying, with the agent, a signature of the quote, the nonce, and the buffer measurement result;

measuring, with the agent, the specified kernel space to produce a further result; and verifying, with the agent, that the further result matches the first result.

4. The method of claim 3, wherein the specified kernel space is a kernel space of an inner kernel of a split kernel operating system.

5. The method of claim 4, further comprising:

confirming, with the agent, that a processor of a system that the kernel is installed on is operating in a non-root mode; and confirming, with the agent, that an exit to a root mode is a valid memory address that is within range of the kernel space of the inner kernel.

6. The method of claim 5, further comprising:

in response to the processor operating in the non-root mode and the exit to the root mode not being within the range of the kernel space of the inner kernel, initiating, with the agent, a remedial action.

7. The method of claim 3, wherein the agent continually measures and verifies the specified kernel space.

8. The method of claim 3, further comprising:

in response to the further result not matching the first result, initiating, with the agent, a remedial action; and in response to the nonce, the signature, or the buffer measurement result not being verified, initiating, with the agent, a remedial action.

9. The method of claim 3, further comprising:

determining, with the agent, that the initialization of the kernel took an amount of time greater than a threshold, the amount of time being based on a reception of a starting time of the initialization of the kernel in the indicator.

10. The method of claim 1, wherein the second device is a trusted platform module (TPM).

11. The method of claim 1, wherein the first device is a baseboard controller manager (BMC).

* * * * *